United States Patent [19]

Maeda

[11] Patent Number: 4,914,687

[45] Date of Patent: Apr. 3, 1990

[54] VOICE INFORMATION TRANSMISSION SYSTEM

[75] Inventor: Hiroshi Maeda, Atsugi, Japan

[73] Assignee: Ricoh Company, Ltd., Tokyo, Japan

[21] Appl. No.: 347,226

[22] Filed: May 4, 1989

[30] Foreign Application Priority Data

May 9, 1988 [JP] Japan ................................. 63-110595

[51] Int. Cl.⁴ ...................... H04M 1/64; H04M 11/00
[52] U.S. Cl. ......................................... 379/88; 379/84; 379/100
[58] Field of Search ...................... 379/67, 89, 88, 84, 379/100, 94

[56] References Cited

U.S. PATENT DOCUMENTS 4,389,546  6/1983  Glisson et al. ......................... 379/88
4,706,270  11/1987  Astegiano et al. ...................... 379/2

FOREIGN PATENT DOCUMENTS 0202156  12/1982  Japan ................................... 379/244

Primary Examiner—Thomas W. Brown
Attorney, Agent, or Firm—Oblon, Spivak, McClelland, Maier & Neustadt

[57] ABSTRACT

A voice information transmission system includes a center apparatus provided with a library of responding voice messages, and a communication terminal device. The communication terminal device receives a desired responding voice message from the center apparatus and uses this desired responding voice message as its own responding voice message.

11 Claims, 6 Drawing Sheets

VOICE INFORMATION TRANSMISSION SYSTEM

BACKGROUND OF THE INVENTION

The present invention generally relates to voice information transmission systems, and more particularly to a voice information transmission system which sets a responding voice message.

Communication terminal devices which respond to a caller by a voice message are reduced to practice. Examples of such communication terminal devices are so-called answering phones, facsimile machines provided with a voice responding function and the like. In such communication terminal devices, the responding voice message is preset or a user must set the responding voice message.

However, the conventional communication terminal devices having the voice responding function suffer the following problems.

That is, in the case of the communication terminal device in which the responding voice message is preset, the responding voice message is stored in a memory device such as a read only memory (ROM) which cannot be rewritten. Hence, the responding voice message in principle cannot be changed. Even if the ROM can be rewritten and the responding voice message is to be changed, it is necessary to carry out a troublesome operation of rewriting the content of the ROM and this would make the communication terminal device not very user-friendly.

On the other hand, in the case of the communication terminal device in which the user sets the responding voice message, the user must be familiar with an operation of entering the voice message. As a result, when the user is not very familiar with the operation, an unnatural or forced voice message may be entered and a caller who hears this voice message may feel unpleasant. In addition when the user wishes to enter the responding voice message in a voice of a desired celebrity, for example, it is difficult to find a suitable message in the voice of the desired celebrity.

SUMMARY OF THE INVENTION

Accordingly, it is a general object of the present invention to provide a novel and useful voice information transmission system in which the problems described above are eliminated.

Another and more specific object of the present invention is to provide a voice information transmission system which includes a center apparatus provided with a library of responding voice messages, wherein a communication terminal device receives a desired responding voice message from the center apparatus and uses this desired responding voice message as its own responding voice message. According to the voice information transmission system of the present invention, it is possible to set the responding voice message by a simple operation.

Still another object of the present invention is to provide a voice information transmission system for transmitting a responding voice information to a communication terminal device which has a voice responding function via a telephone line, comprising a center apparatus including responding voice data library means for storing one or a plurality of digitized responding voice data, first modem means for modulating and transmitting data to and receiving and demodulating data from the telephone line, and first control means for controlling an operation of the center apparatus, and a communication terminal device including second modem means for modulating and transmitting data to and receiving and demodulating data from the telephone line, responding voice data storage means for storing a responding voice data which is received through the second modem means, and second control means for controlling an operation of the communication terminal device. The first control means controls the center apparatus to read out a designated responding voice data from the responding voice data library means in response to a request for a responding voice data and an identification information for identifying the designated responding voice data which are received from the communication terminal device and controlling the first modem means to modulate the designated responding voice data and transmit the designated responding voice data to the communication terminal device via the telephone line. The second control means controls the communication terminal device to store the designated responding voice data received from the center apparatus through the second modem means into the responding data storage means for use as a responding voice data of the communication terminal device. According to the voice information transmission system of the present invention, it is possible to set the responding voice message by a simple operation because the communication terminal device can use the responding voice messages stored in the responding voice data library means of the center apparatus.

A further object of the present invention is to provide a voice information transmission system for transmitting a responding voice information to a communication terminal device which has a voice responding function via a telephone line, comprising a center apparatus including responding voice data library means for storing one or a plurality of digitized responding voice data, call signal detecting means for detecting a call received via the telephone line, push button signal detecting means for detecting a push button signal received via the telephone line, and first control means for controlling an operation of the center apparatus, and a communication terminal device including input means for entering an input number which selects a desired responding voice data, push button signal generating means for generating a push button signal which corresponds to the input number and for transmitting the push button signal to the telephone line, responding voice data storage means for storing a responding voice data which is received via the telephone line, and second control means for controlling an operation of the communication terminal device. The first control means controls the center apparatus to successively read out the responding voice data from the responding voice data library means and transmit the successively read out responding voice data to the communication terminal device via the telephone line when the call signal detecting means detects a call, and the second control means controls the communication terminal device to generate a push button signal which corresponds to the input number when the input number designates the responding voice data which is received from the center apparatus. In addition, the first control means controls the center apparatus to read out the designated responding voice data from the responding voice data library means when the push button signal is detected by the push button signal detecting means and transmit the designated responding voice data to the communication terminal device via the telephone line, and the second control means controls the communication terminal device to store the designated responding voice data received from the center apparatus into the responding data storage means for use as a responding voice data of the communication terminal device.

Other objects and further features of the present invention will be apparent from the following detailed description when read in conjunction with the accompanying drawings.

DETAILED DESCRIPTION

Figure 1:
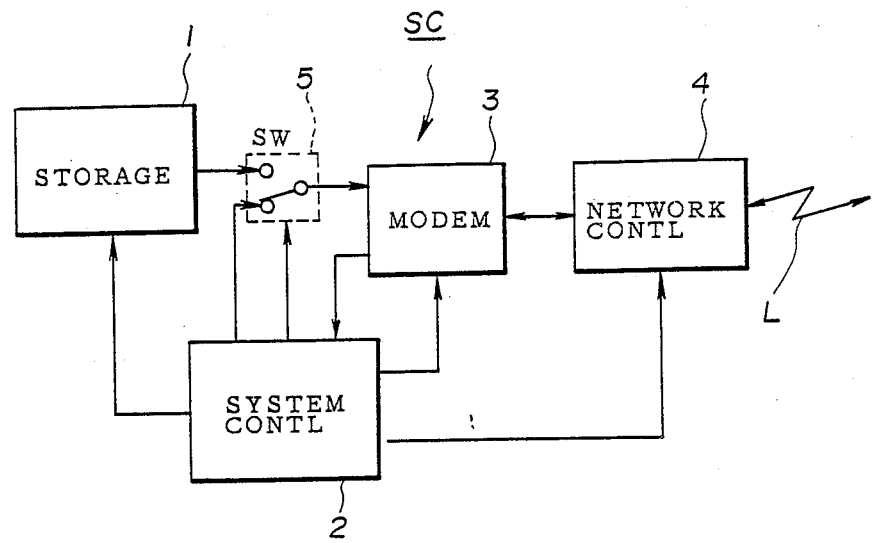
FIG. 1 is a system block diagram showing a center apparatus of a first embodiment of a voice information transmission system according to the present invention.
Figure 2:
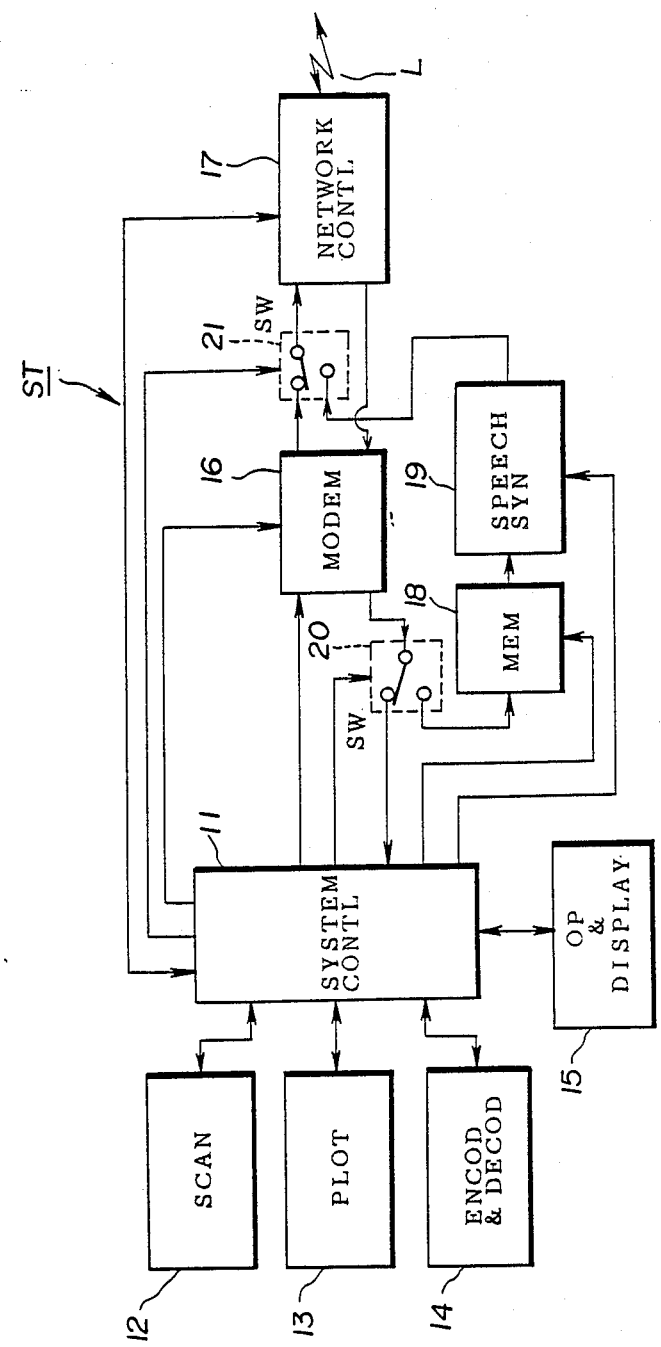
FIG. 2 is a system block diagram showing a facsimile machine of the first embodiment of the voice information transmission system according to the present invention.

FIG. 1 shows a center apparatus of a first embodiment of a voice information transmission system according to the present invention, and FIG. 2 shows a facsimile machine of the first embodiment of the voice information transmission system according to the present invention. In this embodiment, a facsimile machine ST has a voice responding function, and the facsimile machine ST and a center apparatus SC transmit and receive voice message data by use of a facsimile transmission control procedure.

In the center apparatus SC shown in FIG. 1, a voice message data storage 1 stores voice message data and constitutes a voice message library. For example, the voice message data stored in the voice message data storage 1 are obtained by encoding and compressing in conformance with a predetermined voice encoding system voice messages of various contents which are recorded in various voices such as voices of celebrities. In addition, an identification number is added to each of the voice message data.

A system controller 2 controls the operation of the center apparatus SC and processes the facsimile transmission procedure.

A modem 3 carries out predetermined modulation and demodulation processes for transmitting and receiving digital data to and from a telephone line L. This modem 3 has a low-speed modem function and a high-speed modem function of a facsimile machine in conformance with a Group III mode recommended by the CCITT.

A network control unit 4 connects the center apparatus SC to the telephone line L and has automatic calling and automatic answering functions.

A switch 5 switches to connect one of the voice message storage 1 and the system controller 2 to a transmission data input side of the modem 3. A reception data received by the modem 3 is supplied to the system controller 2.

On the other hand, in the facsimile machine ST shown in FIG. 2, a system controller 11 carries out an internal process of the facsimile machine ST, a processing of the facsimile transmission procedure and a control process for controlling each element of the facsimile machine ST. A scanner 12 reads a document image with a predetermined resolution, and a plotter 13 records an image with a predetermined resolution.

An encoder and decoder 14 encodes and compresses an image signal and also decodes and expands the coded compressed image signal back into the original image signal. An operation and display device 15 includes various manipulation keys and a display which are required to operate the facsimile machine ST.

A modem 16 carries out predetermined modulation and demodulation processes for transmitting and receiving digital data to and from the telephone line L. A network control unit 17 connects the facsimile machine ST to the telephone line L. This network control unit 17 has automatic calling and automatic answering functions.

A message data memory 18 stores responding voice message data which is used by the facsimile machine ST when responding to the other party on the other end of the telephone line L, for example. A speech synthesis device 19 generates the original voice message based on the responding voice message data stored in the message data memory 18. This speech synthesis device 19 employs an encoding system identical to the encoding system of the voice messages stored in the voice message data storage 1.

A switch 20 outputs a reception data received by the modem 16 to one of the system controller 11 and the message data memory 18. On the other hand, a switch 21 supplies to a transmission signal input side of the network control unit 17 one of a transmission signal outputted from the modem 16 and a voice message signal outputted from the speech synthesis device 19. A reception signal received by the network control unit 17 is supplied to the modem 16.

When an operator of the facsimile machine ST manipulates the operation and display device 15 and enters a destination number of the center apparatus SC, the identification number of a desired responding voice message which is to be received, and a voice reception start instruction, the system controller 11 outputs the entered destination number to the network control unit 17 to call the destination center apparatus SC and starts a predetermined voice reception process.

The operator of the facsimile machine ST is informed in advance of the contents of the responding voices stored in the voice message data storage 1 of the center apparatus SC by a catalog or the like which lists the contents and the identification numbers of the voice messages.

Next, a description will be given of the operations of the facsimile machine ST and the center apparatus SC.

Figure 3:
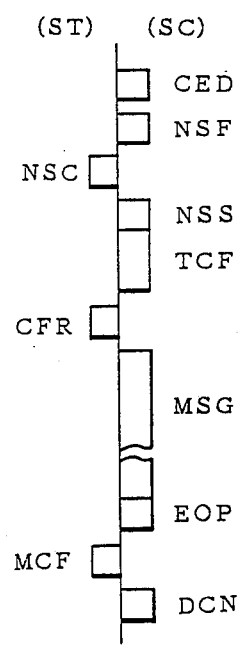
FIG. 3 is a time chart for explaining a transmission procedure of the first embodiment.

When the facsimile machine ST calls the center apparatus SC and the center apparatus SC detects the call, the center apparatus SC first responds by a called station identification signal CED to indicate that the center apparatus SC is not an audio terminal device and then responds by a non-standard facilities signal NSF to inform the facsimile machine ST of the functions of the center apparatus SC, as shown in FIG. 3. The non-standard facilities signal NSF includes a content for displaying that the center apparatus SC is a center station of the responding voice information.

Accordingly, the facsimile machine ST informs the center apparatus SC by use of a non-standard facilities command signal NSC that a reception of a voice message data is desired together with an identification information on the desired voice message which is to be received. Then, the center apparatus SC transmits a training signal TCF at a modem rate which is set in a state where the transmission function is designated by a non-standard facilities set-up signal NSS.

When the training signal TCF is received satisfactorily, the facsimile machine ST responds by a reception preparation confirmation signal CFR and selects the message data memory 18 by the switch 20 to prepare for the reception.

In a state where the voice message data storage 1 is selected by the switch 5, the center apparatus 5 reads out from the voice message data storage 1 a voice message data MSG having the designated identification information. Hence, the voice message data MSG is supplied to the modem 3 wherein it is modulated and is then outputted on the telephone line L via the network control unit 4 to be received by the facsimile machine ST. The facsimile machine ST successively stores the received voice message data MSG in the message data memory 18.

When the transmission of the voice message data MSG is completed, the center apparatus SC transmits an end of procedure signal EOP and the facsimile machine ST responds by a message confirmation signal MCF. Thus, the center apparatus SC transmits a disconnect signal DCN to disconnect the line and end the transmission of the voice information. When the facsimile machine ST receives the disconnect signal DCN, the line is disconnected and the transmission of the voice information is ended.

Therefore, the data on the responding voice message requested by the operator of the facsimile machine ST is stored in the message data memory 18.

When the facsimile machine ST responds to an audio terminal device on the other end of the telephone line L by a voice message with a prescribed timing, the system controller 11 reads out the voice message data from the message data memory 18 in a state where the speech synthesis device 19 is selected by the switch 21 and starts a speech synthesis operation of the speech synthesis device 19. Hence, a voice signal which is the base of the voice message data is outputted from the speech synthesis device 19. This voice signal is supplied on the telephone line L via the switch 21 and the network control unit 17.

Therefore, the responding voice message which is entered from the center apparatus SC by the operator of the facsimile machine ST is outputted as a response to the audio terminal device on the other end of the telephone line L.

Figure 4:
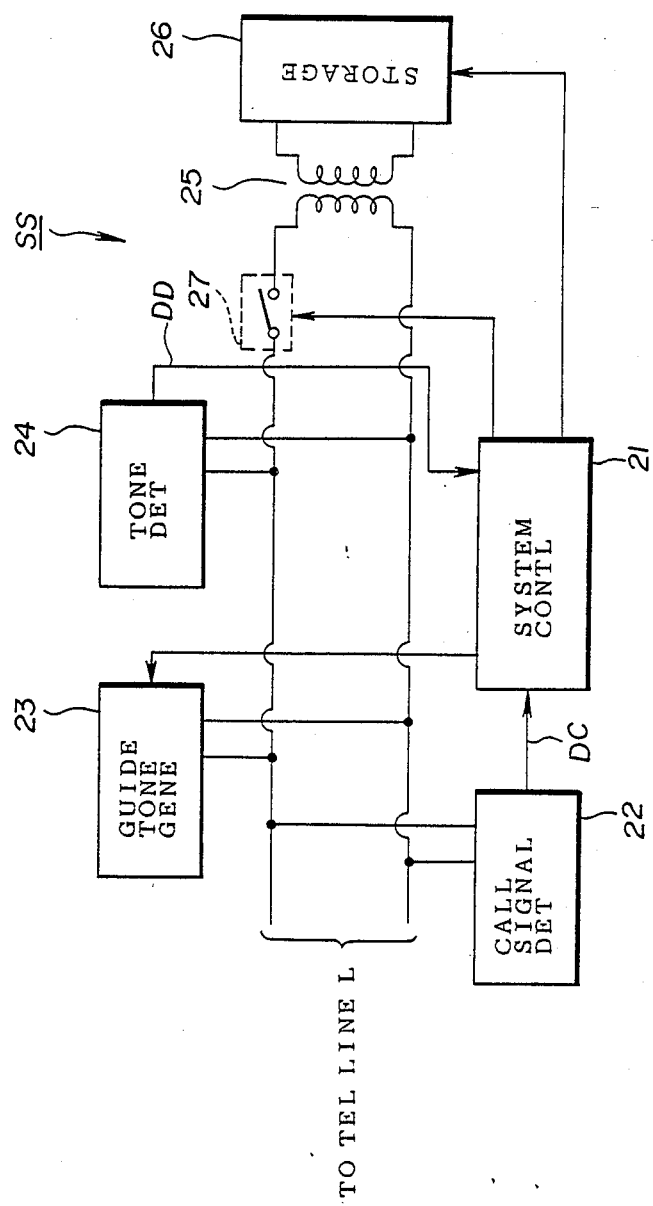
FIG. 4 is a system block diagram showing a center apparatus of a second embodiment of the voice information transmission system according to the present invention.
Figure 5:
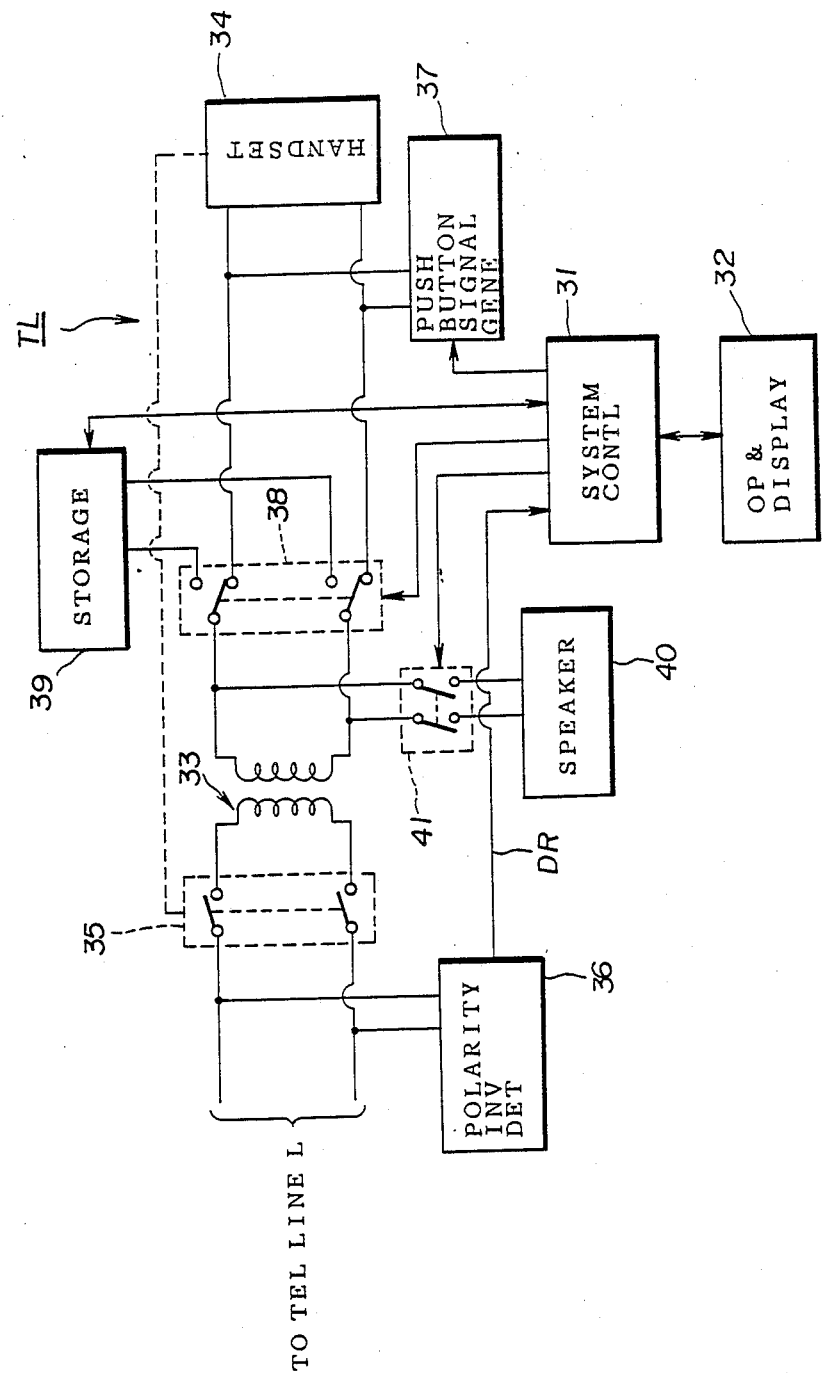
FIG. 5 is a system block diagram showing an answering phone of the second embodiment of the voice information transmission system according to the present invention.

FIG. 4 shows a center apparatus of a second embodiment of the voice information transmission system according to the present invention, and FIG. 5 shows an answering phone of the second embodiment of the voice information transmission system according to the present invention.

In a center apparatus SS shown in FIG. 4, a system controller 21 processes a control operation of the center apparatus SS. A call signal detector 22 detects a call signal and a detection signal DC outputted from the call signal detector 22 is supplied to the system controller 21.

A guide tone generator 23 generates a guide tone having a predetermined frequency in response to an instruction from the system controller 21. The guide tone is supplied on the telephone line L.

A tone detector 24 detects a push button signal transmitted via the telephone line L and various tone signals outputted from an exchange for line control. An output detection signal DD of the tone detector 24 is supplied to the system controller 21.

A transformer 25 is provided to make an A.C. coupling between the telephone line L and a voice message storage 26. A relay 27 for connecting/disconnecting the line is connected between the telephone line L and one end of the transformer 25 on the side of the telephone line L.

For example, the voice message storage 26 is made up of a recording/reproducing apparatus such as an audio tape recorder having an index function and stores voice messages of various contents in various voices such as the voices of celebrities. Each of the voice messages stored in the voice message storage 26 can be identified by a corresponding index.

In an answering phone TL shown in FIG. 5, a system controller 31 controls the operation of the answering phone TL. An operation and display device 32 includes various manipulation keys including a ten-key and a display which are required to operate the answering phone TL. For example, the display of the operation and display device 32 is made up of light emitting diodes (LEDs) for displaying an operating mode of the answering phone TL.

A transformer 33 is provided to connect a handset 34 and the telephone line L in a state where D.C. component is cut off. The transformer 33 on the side of the telephone line L is opened and closed by a hook switch 35 which is controlled responsive to hooked and unhooked states of the handset 34.

A polarity inversion detector 36 is connected to the transformer 33 on the side of the telephone line L and detects an inversion of a D.C. voltage applied to the telephone line L. An output detection signal DR of the polarity inversion detector 36 is supplied to the system controller 31.

A push button signal generator 37 generates a push button signal which is supplied to the transformer 33 on the side of the handset 34.

A relay 38 connects an end of the transformer 33 on the side of the handset 34 to one of the handset 34 and a voice message storage 39 which is made up of an audio tape recorder or the like.

A speaker 40 converts the voice signal received via the telephone line L into sound. At the transformer 33 on the side of the handset 34, a signal at a portion immediately before the relay 38 is supplied to the speaker 40 via a relay 41.

Figure 6:
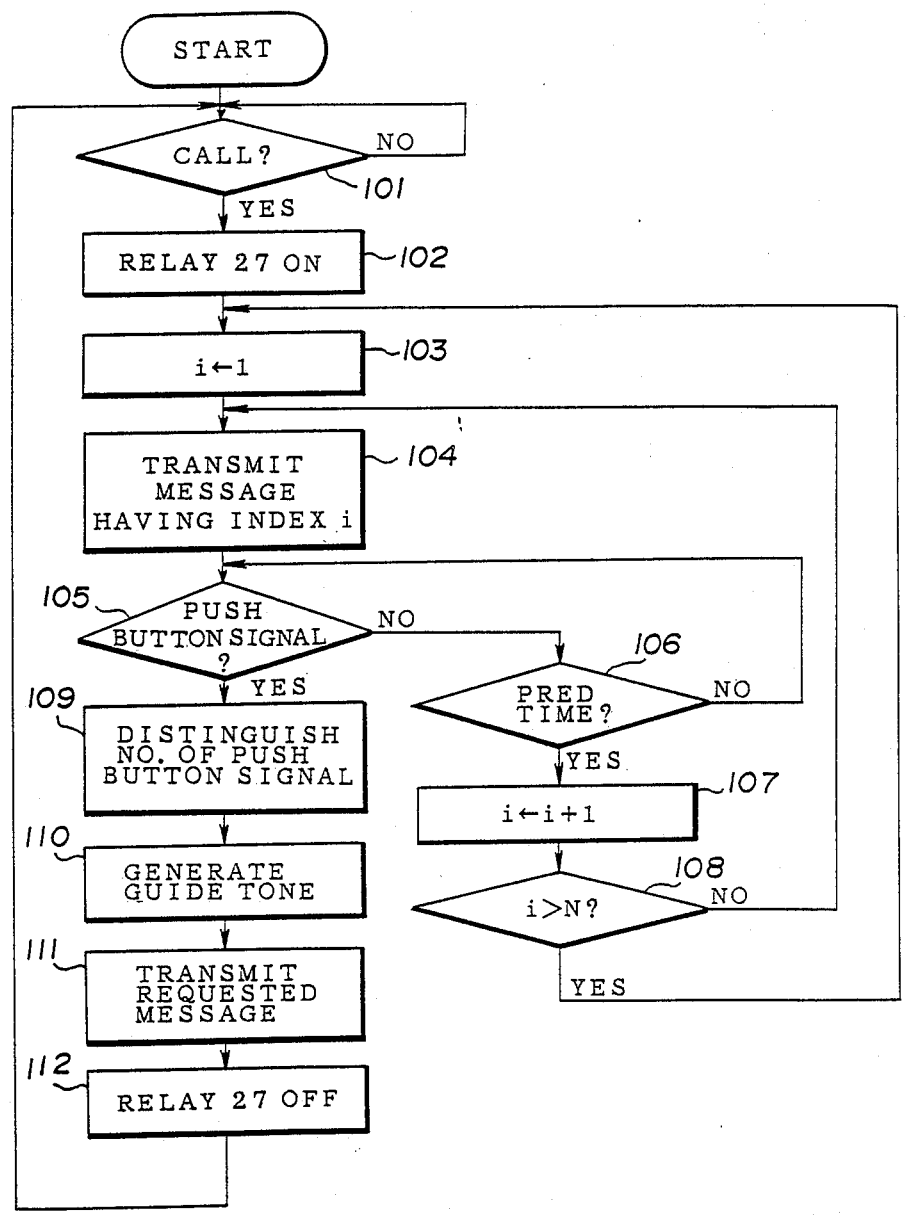
FIG. 6 is a flow chart for explaining an operation of the center apparatus shown in FIG. 4.

FIG. 6 shows an embodiment of a process carried out by the system controller 21 of the center apparatus SS. A step 101 discriminates from the output detection signal DC of the call signal detector 22 whether or not a call signal is detected. When the discrimination result in the step 101 becomes YES, a step 102 turns the relay 27 ON to connect to the telephone line L. A step 103 initially sets a value of a loop count i to "1". A step 104 operates the voice message storage 26 in a playback mode in a state where the value of the loop count i is set as the index information and transmits the voice message having the index i to the telephone line L.

A step 105 discriminates whether or not a push button signal is received from the other device on the other end of the telephone line L. When the discrimination result in the step 105 is NO, a step 106 discriminates whether or not a predetermined time has elapsed from a time when the process of the step 104 is completed. The process returns to the step 105 when the discrimination result in the step 106 is NO. When the discrimination result in the step 106 becomes NO, a step 107 increments the value of the loop count i by one, and a step 108 discriminates whether or not the value of the loop count i is greater than a number N of the voice messages stored in the voice message storage 26.

When the discrimination result in the step 108 is NO, the transmission of all of the requested voice messages is not yet completed and the process returns to the step 104 to transmit the next voice message. On the other hand, when the discrimination result in the step 108 is YES, the transmission of all of the requested voice messages is completed and the process returns to a step 103 to repeat the transmission of the voice messages.

On the other hand, when a push button signal is received and detected by the tone detector 24 and the system controller 21 receives the detection signal DD which indicates the content of the detected push button signal, the discrimination result in the step 105 becomes YES. In this case, a step 109 distinguishes a number of the received push button signal based on the detection signal DD. A step 110 generates a guide tone by the guide tone generator 23, and a step 111 transmits the requested voice message by making access to the voice message storage 26 by using the number distinguished in the step 109 as the index information. A step 112 turns the relay 27 OFF to disconnect the telephone line L and returns to a waiting state.

Hence, when the center apparatus SS detects a call, the center apparatus SS responds to the caller and successively reads the voice messages stored in the voice message storage 26. This operation of successively reading the voice messages is repeated until the center apparatus SS receives a push button signal which designates a voice message. When one of the voice messages is designated by the push button signal, the center apparatus SS transmits the requested voice message immediately after the guide tone. When the caller is disconnected during this process, the center apparatus SS discontinues the process and returns to the waiting state when the tone detector 24 detects a busy tone.

Figure 7:
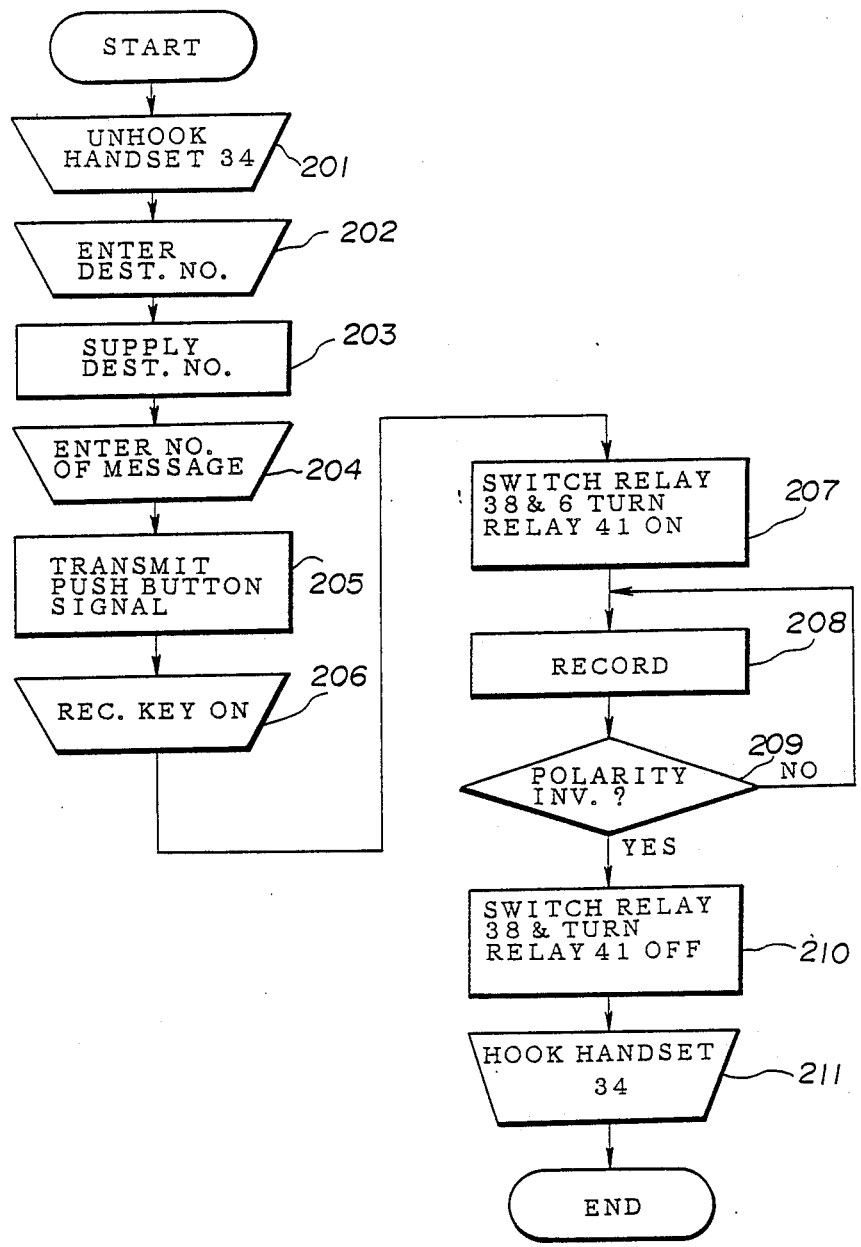
FIG. 7 is a flow chart for explaining an operation of the answering phone shown in FIG. 5.

FIG. 7 shows an embodiment of a process carried out by the system controller 31 of the answering phone TL together with an operation made by the operator of the answering phone TL. The operator unhooks the handset 34 in a step 201 thereby turning the hook switch 35 ON to connect to the telephone line L. Then, the operator manipulates the ten-key of the operation and display device 32 in a step 202 to enter a destination number of the center apparatus SS.

The system controller 31 in a step 203 supplies each digit of the entered destination number to the push button signal generator 37. Hence, a push button signal is successively generated from the push button signal generator 37 and the center apparatus SS is called.

When the center apparatus SS responds to the call, the voice messages are successively transmitted from the center apparatus SS as described before. The operator listens to these voice messages and in a step 204 enters a number indicating a desired message from the ten-key of the operation and display device 32.

In a step 205, the system controller 31 supplies the number information entered from the ten-key to the push button signal generator 37 and transmits to the center apparatus SS a push button signal which corresponds to the number information.

Accordingly, the center apparatus SS transmits the designated voice message next to the guide tone, and the operator in a step 206 turns ON a recording key of the operation and display device 32 when he hears the guide tone.

Thus, the system controller 31 in a step 207 switches the relay 38 to select the voice message storage 39 and turns ON the relay 41 to make the speaker 40 operative. Thereafter, the system controller 31 in a step 208 operates the voice message storage 39 in the recording mode, and in a step 209 discriminates whether or not polarity of the telephone line L is inverted. The process returns to the step 208 when the discrimination result in the step 209 is NO. In other words, the system controller 31 receives the output detection signal DR of the polarity inversion detector 36 and operates the voice message storage 39 in the recording mode until the center apparatus SS disconnects from the telephone line L and the polarity of the telephone line L is inverted. As a result, the voice message is stored in the voice message storage 39 and is also outputted as sound via the speaker 40.

When the discrimination result in the step 209 becomes YES, the system controller 31 in a step 210 switches the relay 38 to select the handset 34 and turns OFF the relay 41. In addition, when the operator finishes listening to the voice message from the speaker 40, the operator in a step 211 hooks up the handset 34 to turn OFF the hook switch 35 and disconnect from the telephone line L.

Therefore, the operator can obtain the voice message from the center apparatus SS and record the voice message on the answering phone TL. Thereafter, when responding by the voice message, the system controller 31 operates the voice message storage 39 in the playback mode in a state where the voice message storage 39 is selected by the relay 38.

In the described embodiments, the audio tape recorder is used as an example of the voice message storages 26 and 39. However, the voice message storages 26 and 39 may be constituted by a combination of a voice encoding/synthesis device and a memory.

In addition, the described embodiments employ the facsimile machine having the voice responding function and the answering phone, but the present invention is of course applicable to other terminal devices which connect to the telephone line.

Further, the present invention is not limited to these embodiments, but various variations and modifications may be made without departing from the scope of the present invention.

What is claimed is:

1. A voice information transmission system for transmitting a responding voice information to a communication terminal device which has a voice responding function via a telephone line, said voice information transmission system comprising:
- a center apparatus including responding voice data library means for storing one or a plurality of digitized responding voice data, first modem means for modulating and transmitting data to and receiving and demodulating data from the telephone line, and first control means for controlling an operation of said center apparatus; and
- a communication terminal device including second modem means for modulating and transmitting data to and receiving and demodulating data from the telephone line, responding voice data storage means for storing a responding voice data which is received through said second modem means, and second control means for controlling an operation of said communication terminal device,
- said first control means controlling said center apparatus to read out a designated responding voice data from said responding voice data library means in response to a request for a responding voice data and an identification information for identifying the designated responding voice data which are received from said communication terminal device and controlling said first modem means to modulate the designated responding voice data and transmit the designated responding voice data to said communication terminal device via the telephone line,
- said second control means controlling said communication terminal device to store the designated responding voice data received from said center apparatus through said second modem means into said responding data storage means for use as a responding voice data of said communication terminal device.

2. The voice information transmission system as claimed in claim 1 wherein said responding voice data library means stores a plurality of responding voice data which are related to various messages in a plurality of kinds of voices.

3. The voice information transmission system as claimed in claim 1 wherein each of the responding voice data stored in said responding voice data library means are added with an identification number, said first control means making access to the responding voice data stored in said responding voice data library means by the identification number based on the identification information received from said communication terminal device.

4. The voice information transmission system as claimed in claim 1 wherein said communication terminal device further includes speech synthesis means for generating a speech based on the responding voice data read out from said responding voice data storage means, and switching means for selectively coupling one of said second modem means and said speech synthesis means to the telephone line.

5. The voice information transmission system as claimed in claim 1 wherein said communication terminal device further includes operation and display means, said operation and display means including keys for entering a destination number and an identification number of the designated responding voice data.

6. The voice information transmission system as claimed in claim 1 wherein said communication terminal device is a facsimile machine, said facsimile machine including a network control unit which is coupled between said second modem means and the telephone line and has automatic calling and automatic answering functions.

7. A voice information transmission system for transmitting a responding voice information to a communication terminal device which has a voice responding function via a telephone line, said voice information transmission system comprising:
- a center apparatus including responding voice data library means for storing one or a plurality of digitized responding voice data, call signal detecting means for detecting a call received via the telephone line, push button signal detecting means for detecting a push button signal received via the telephone line, and first control means for controlling an operation of said center apparatus; and
- a communication terminal device including input means for entering an input number which selects a desired responding voice data, push button signal generating means for generating a push button signal which corresponds to the input number and for transmitting the push button signal to the telephone line, responding voice data storage means for storing a responding voice data which is received via the telephone line, and second control means for controlling an operation of said communication terminal device,
- said first control means controlling said center apparatus to successively read out the responding voice data from said responding voice data library means and transmit the successively read out responding voice data to said communication terminal device via the telephone line when said call signal detecting means detects a call,
- said second control means controlling said communication terminal device to generate a push button signal which corresponds to the input number when the input number designates the responding voice data which is received from said center apparatus,
- said first control means controlling said center apparatus to read out the designated responding voice data from said responding voice data library means when the push button signal is detected by said push button signal detecting means and transmit the designated responding voice data to said communication terminal device via the telephone line,
- said second control means controlling said communication terminal device to store the designated responding voice data received from said center apparatus into said responding data storage means for use as a responding voice data of said communication terminal device.

8. The voice information transmission system as claimed in claim 7 wherein said responding voice data library means stores a plurality of responding voice data which are related to various messages in a plurality of kinds of voices.

9. The voice information transmission system as claimed in claim 7 wherein each of the responding voice data stored in said responding voice data library means are added with an identification number, said first control means making access to the responding voice data stored in said responding voice data library means by the identification number based on the input number received from said communication terminal device.

10. The voice information transmission system as claimed in claim 7 wherein said input means includes keys for entering a destination number and the input number of the designated responding voice data.

11. The voice information transmission system as claimed in claim 7 wherein said communication terminal device is an answering phone.

* * * * *